May 25, 1954

D. L. SPENDER ET AL 2,679,409

CLINCHER COUPLING

Filed Jan. 24, 1951

INVENTORS.
Donald L. Spender
Henry J. Kachergis
By
H. F. Johnston
Attorney

Patented May 25, 1954

2,679,409

UNITED STATES PATENT OFFICE 2,679,409

CLINCHER COUPLING

Donald L. Spender, Wolcott, and Henry J. Kachergis, Waterbury, Conn., assignors to Scovill Manufacturing Company, Waterbury, Conn., a corporation of Connecticut Application January 24, 1951, Serial No. 207,536

1 Claim. (Cl. 285—84)

This invention relates to hose couplings or menders and particularly to the clincher member used in association therewith in making connection to the end of a hose.

It has been customary in the past to make such clincher members with a series of fingers projecting outwardly on a bias from a continuous ring and each finger being straight throughout its length and terminating in a flanged or gripper end. It was usual to provide ten or more fingers to a clincher member and have them spaced somewhat apart.

These fingers in being made straight lie flat against the outer surface of the hose when hammered thereagainst and so do not exert a sufficient binding force around the complete circumference of the hose material to effect a seal except at the finger ends which are provided with inturned flanges. These flanges as formerly designed bite into the hose material and are intended to effect a seal at that point. In fact they would effect a continuous bite and cut into the hose around its complete circumference resulting in greater liability of breakage of the hose at that point.

According to our invention, first, a considerably smaller number of fingers are used; secondly, they are curved in transverse section so that they exert a uniform binding action completely around the hose at their mid portions; thirdly, they are curved or bowed inwardly in a lengthwise direction so that they tend to crowd the hose material over a considerable area and provide a sealing effect in that portion rather than relying on the flanged ends; fourthly, the cut-outs or spaces between the fingers are of such predetermined size and shape that the edges of the curved sections come together when the clincher fingers are bent against the hose; fifthly, the end flanges have deep cut-outs so as to provide in effect teeth which bite into the hose material but which do not cut a continuous ring in the hose thereby lessening the liability of failure of the hose at that point.

With our improved construction a leak-proof joint is obtained not by reliance upon a continuous bearing of the flanges on the hose but by continuous bearing of the curved mid sections of the fingers.

The preferred embodiment of our invention is shown in the accompanying drawing in connection with a female hose coupling and of course it is applicable as well to a male coupling.

Figure 5:
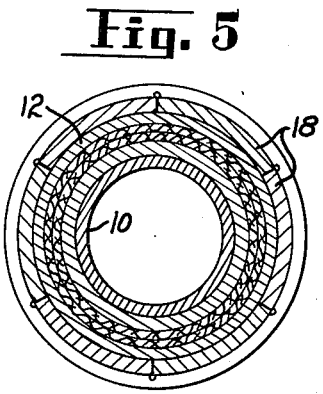
Fig. 5 is a transverse sectional view through the coupling as assembled, the view taken along the line 5—5 of Fig. 3.

In the drawing the numeral 10 refers to a hollow nipple having one end provided with a series of buttress-shaped circumferential enlargements 11 and which are adapted to be inserted into a hose 12. The opposite end of the nipple is provided with an outward flange 13. Connected to this end of the nipple is a connecting nut 14 having a flanged end 15 that engages in back of the nipple flange 13 for swivelly connecting the nut with the nipple. A clincher member 16 is provided that consists of a continuous ring portion 17 that is initially of conical shape as seen in the upper section of Fig. 1. A series of fingers 18 extend backwardly from the outer edge of the ring 17 and preferably there are only six of these fingers provided. These fingers are made arcuate in their transverse section as seen in Fig. 5 to give them greater strength and also to conform to the outer shape of the hose. The outer ends of the fingers are formed with inwardly directed flanges 19, the terminal ends of which are provided with cut-out portions 20 thus providing for a pair of spaced teeth 21. Also each of the fingers in their longitudinal section is curved inwardly to provide a bowed section 22.

Figure 1:
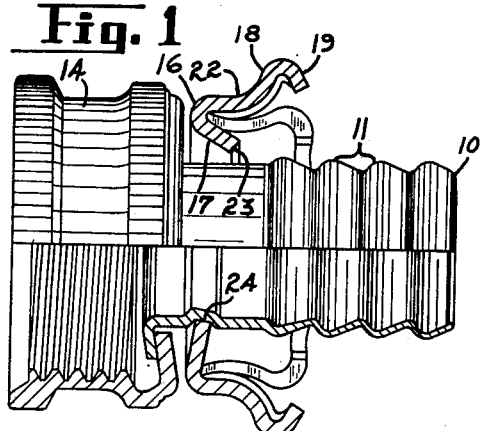
Fig. 1 is a part section and part side view of the coupling construction as it appears before assembly to a hose.
Figure 2:
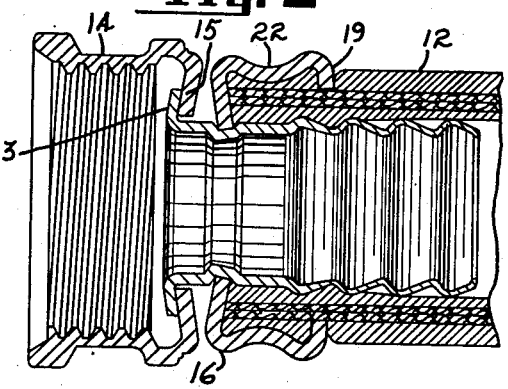
Fig. 2 is a sectional view through the coupling as it appears when assembled to a hose.
Figure 4:
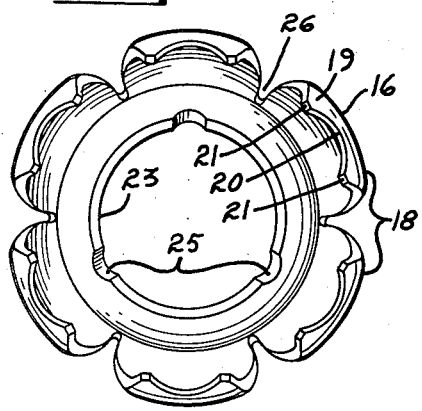
Fig. 4 is an end view of the clincher member per se.

In order to secure the clincher member 16 permanently to the nipple 10, the conical ring 17 is forced outwardly from its original conical state wherein the opening 23 in the ring will be reduced in diameter causing the inner edge of the ring 17 to be forced into the nipple and form its own groove as shown at 24 in the lower half of Fig. 1. Recesses 25 provided in the edge of ring 17 serve to grip the nipple material so as to prevent relative rotation of the clincher member and the nipple. As shown in Fig. 1 the clincher member 16 in being assembled to the nipple 10 will preferably be held in spaced relationship to the nut 14 so as to prevent any binding action.

Figure 3:
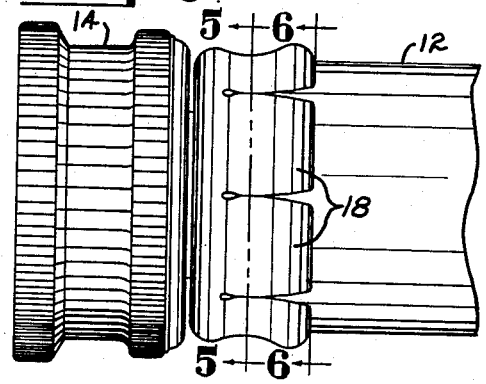
Fig. 3 is a side elevational view of the same.
Figures 6, 7:
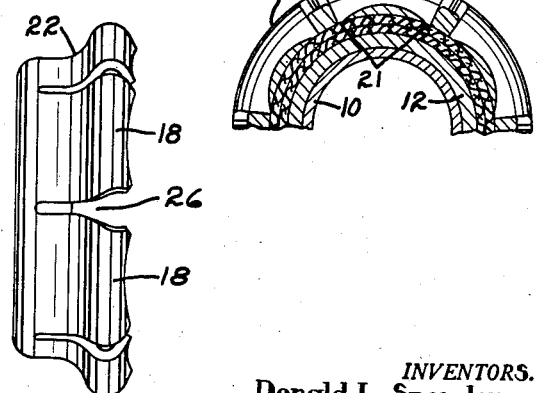
Fig. 6 is a transverse partial sectional view taken along the line 6—6 of Fig. 3.
Fig. 7 is a side view of the clincher member per se.

The cut-outs 26 between the fingers 18 in the condition just prior to assembly of the hose, as seen in Fig. 7, are narrower at the apex and widen out in a curve towards the ends of the fingers. The size and shape of these cut-outs 26 are predetermined to bring the adjacent side edges of the fingers 18 into abutting relation when the clincher fingers are bent against the hose material as seen in Fig. 3. In addition to the fact that this provides a continuous grip around the hose in the zone of the bowed midsection 22 of the fingers 18 the abutment of these fingers serves in effect as a stop to prevent the end flanges 19 of the fingers being driven too far into the hose material.

Another important feature of the bowed fingers is that when they are closed about a hose end this clincher member can assure a firm circumferential squeeze on various hose of different wall thicknesses to which the coupling may be affixed.

As a result of our invention it will be evident that for the first time a clincher coupling is provided which eliminates the aforementioned drawbacks of former clincher couplings, thus extending their serviceability and field of use.

What we claim is:

In a hose coupling, a nipple for insertion into the end of a hose, a clincher member surrounding the nipple, said clincher member having a ring portion securing it to the nipple, a series of fingers extending backwardly from said ring portion, said fingers flaring outwardly so that their free ends lie in a circle of substantially larger diameter than said ring portion and being bendable to a different set position with respect to said ring portion, said fingers being curved outwardly in transverse section and being also longitudinally bowed inwardly, said fingers being sufficiently wide and close together at their inwardly bowed portions that when they are bent inwardly to a set position where the free ends lie in the same size circle as said ring portion the inwardly bowed portions which will then lie in a smaller circle will be substantially in edge-to-edge contact so as to exert substantially continuous pressure around a hose, said fingers having inturned flanges on their free ends to provide teeth that bite into the hose material, the free ends including the flanges being sufficiently narrower than the inwardly bowed portions that when so bent they will not come into edge-to-edge contact, the transverse curvature of the fingers corresponding approximately to the curvature of the periphery of the ring portion.

References Cited in the file of this patent

UNITED STATES PATENTS

| Number | Name | Date |
|---|---|---|
| 946,703 | Nelson | Jan. 18, 1910 |
| 1,083,269 | Bradnack | Jan. 6, 1914 |
| 1,321,324 | Nelson | Nov. 11, 1919 |
| 1,486,421 | Dyer | Mar. 11, 1924 |
| 1,965,426 | Nelson | July 3, 1934 |
| 2,142,752 | Howard | Jan. 3, 1939 |
| 2,280,892 | Cowles | Apr. 28, 1942 |
| 2,437,933 | Brennan | Mar. 6, 1948 |

FOREIGN PATENTS

| Number | Country | Date |
|---|---|---|
| 248,162 | Great Britain | Mar. 4, 1926 |
| 275,802 | Great Britain | Aug. 18, 1927 |